United States Patent Office 3,784,610
Patented Jan. 8, 1974

3,784,610
SUBSTITUTED PHENOXY- AND PHENYLTHIO-ALKANOLS AND ALKANETHIOLS
Eric R. Larsen, 314 W. Meadowbrook Drive; Lennon H. McKendry, 205 Hollybrook Drive; and Fred Y. Edamura, 509 Capitol Drive, all of Midland, Mich. 48640
No Drawing. Original application Feb. 1, 1971, Ser. No. 111,685. Divided and this application Oct. 30, 1972, Ser. No. 301,877
Int. Cl. C07c *149/32*
U.S. Cl. 260—609 D                         1 Claim

ABSTRACT OF THE DISCLOSURE

Novel substituted phenoxy- and phenylthio-alkanol and alkanethiol compounds corresponding to the formula:

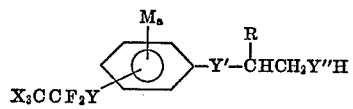

wherein each X independently represents hydrogen, bromo, chloro or fluoro, with the proviso that at least one X is always bromo, chloro or fluoro;
Y, Y' and Y'' each independently represents oxygen or sulfur;
each M independently represents bromo, chloro, iodo, fluoro, nitro or loweralkyl containing from 1 to about 4 carbon atoms, both inclusive;
*a* represents an integer of from 0 to 3, both inclusive, and
R is hydrogen or loweralkyl containing from 1 to about 4 carbon atoms, both inclusive.

The compounds are suitable for use as herbicides and fungicides.

---

CROSS-REFERENCE TO RELATED APPLICATION

This is a division, of application Ser. No. 111,685, filed Feb. 1, 1971.

SUMMARY OF THE INVENTION

The present invention is directed to a series of novel substituted phenoxy- and phenylthio-alkanols and alkanethiols corresponding to the following formula:

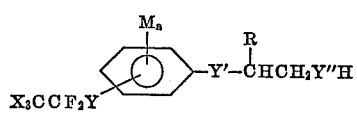

wherein each X independently represents hydrogen, bromo, chloro or fluoro, with the proviso that at least one X is always bromo, chloro or fluoro;
Y, Y' and Y'' each independently represents oxygen or sulfur;
each M independently represents bromo, chloro, iodo, fluoro, nitro or loweralkyl containing from 1 to about 4 carbon atoms, both inclusive;
*a* represents an integer of from 0 to 3, both inclusive, and
R is hydrogen or loweralkyl containing from 1 to about 4 carbon atoms, both inclusive.

As used herein, the term "loweralkyl" means saturated, monovalent aliphatic radicals, including straight and branched-chain radicals of from 1 to about 4 carbon atoms, as illustrated by, but not limited to, methyl, ethyl, propyl, isopropyl, butyl, sec.-butyl and the like.

The products of the present invention are oils or crystalline solids at room temperatures, of low solubility in water and of varying degrees of solubility in many common organic solvents, such as, for example, chloroform, carbon tetrachloride, hexane, acetonitrile, dimethylformamide, ethanol and the like. The compounds of the present invention are useful as herbicides and fungicides and are especially adapted to be employed as active toxicants in compositions for the control of various plants and fungal organisms.

The novel compounds of the present invention are prepared by the reaction of a selected substituted phenoxy- or phenylthio-alkylacetate or alkanethioacetate compound of the formula:

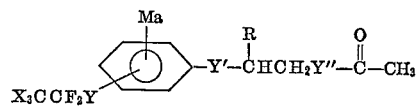

with methanol. In the above formula, X, M, *a*, Y, Y', Y'', and R are as previously defined. In order to decrease reaction time, a small amount of an actuating agent, e.g., concentrated sulfuric, hydrochloric or hydrobromic acid, p-toluenesulfonic acid and the like, can be incorporated into the reaction mixture. In the present invention, the use of such actuating agents is preferred. The reaction proceeds at temperatures of from about 0 to about 120° C.; generally, the reaction mixture is heated at the boiling point under reflux conditions. The pressure is not critical and is usually maintained at ambient atmospheric pressure.

In carrying out the reaction, the reactants are contacted with one another in any convenient fashion; usually, the actuating agent is dispersed in methanol prior to the addition of the substituted phenoxy- or phenylthio-alkylacetate or alkanethioacetate reactant. The resulting reaction mixture is generally maintained at the boiling temperature under reflux conditions for a period of from about 1 to about 4 hours in order to assure substantial completion of the reaction. Following the completion of the reaction, the reaction mixture is diluted with water and extracted with an appropriate organic solvent, such as, for example, carbon tetrachloride, chloroform, methylene chloride and the like. The extracts thus obtained are combined, dried, and evaporated under reduced pressure to obtain the desired product as a solid or liquid residue. The solid product residues can be further purified by solvent extraction, recrystallization and the like, while the liquid product residues can be fractionally distilled to obtain the product as a purified oil.

In an alternative procedure, the novel compounds of the present invention can be prepared by the reaction of a selected substituted phenol or thiophenol compound of the formula:

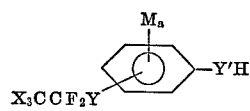

with a substituted alkanol or alkanethiol compound of the formula:

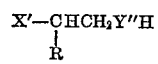

and potassium carbonate. In the above formulas, X, M, *a*, Y, Y', Y'' and R are as previously defined and X' represents bromo, chloro or fluoro. The reaction is conveniently carried out in the presence of an inert solvent which serves as a carrier medium and an actuating agent as previously described. Representative inert solvents include acetonitrile, chloroform, dimethylformamide and the like. The reaction takes place at temperatures of from about 0° to about 120° C., preferably, the reaction is carried out at the boiling temperature of the reaction mixture under reflux conditions. The reaction is conducted under ambient atmospheric pressures over a period of from about 1 to about 25 hours. Following the completion of the reaction, the reaction mixture is evaporated under reduced pressure to obtain the desired product as solid or liquid residue which can be further purified as hereinbefore described.

The desirable properties of the products of the present invention are inherent in the pure compounds; when highly selective properties are to be relied upon, the purified compounds will be preferred. However, for many applications, incompletely purified products can be utilized if desired.

DESCRIPTION OF THE PREFERRED EMBODIMENTS

The following examples illustrate the present invention but as such are not to be construed as limiting the same.

Example 1

2 - (3 - (2,2-dichloro-1,1-difluoroethoxy)phenoxy)ethyl acetate (6.0 grams; 0.02 mole) was dissolved in 50 milliliters of methanol containing approximately 0.5% concentrated sulfuric acid. The resulting reaction mixture was heated at the boiling temperature under reflux conditions for a period of about two hours. Following the substantial completion of the reaction, the reaction mixture was diluted with approximately 150 milliliters of water and subsequently extracted four times with 50 milliliter portions of carbon tetrachloride. The extracts were combined, dried over magnesium sulfate, and evaporated under reduced pressure to obtain the product as a residual oil. Distillation of the residual oil thus obtained resulted in the recovery of the desired 2-(3-(2,2-dichloro-1,1-difluoroethoxy)phenoxy)ethanol product as a colorless oil having a boiling point of 131° C. at 0.25 millimeter of Hg.

In view of the foregoing teachings and in a manner similar to that described in Example 1, there are obtained, inter alia, the following substituted phenoxy- and phenylthio alkanol and alkanethiol compounds by the reaction of the corresponding substituted phenoxy- or phenylthio-alkylacetate or alkanethioacetate reactant with methanol.

ployed therein as a dust. Also, the compound, or a solid composition comprising the compound, can be dispersed in water, typically with the aid of a wetting agent, and the resulting aqueous suspension employed as a spray. In other procedures, the compound can be employed as a constituent of organic liquid compositions, oil-in-water and water-in-oil emulsions, or water dispersions, with or without the addition of wetting, dispersing, or emulsifying agents.

In representative operations, each of the 2-(3-(2,2-dichloro-1,1-difluoroethoxy)phenoxy)ethanol,
2-(4-(2,2-dichloro-1,1-difluoroethoxy)phenoxy)ethanol,
2-(4-(2,2-dichloro-1,1-difluoroethoxy)-2-nitrophenoxy)ethanol, and
2-(2-chloro-5-(2,2-dichloro-1,1-difluoroethoxy)phenoxy)ethanol compounds gives complete control and kill of *Staphylococcus aureus, Candida albicans, Trichophyton mentagrophytes, Bacillus subtilis, Aspergillus terreus, Candida pelliculosa, Pullularia pullulans, Mycobacterium phlei, Rhizopus nigricans* and *Cephaloascus fragrans* when such organisms are treated with compositions containing one of the above compounds at a concentration of 500 parts per million by weight.

In additional operations, 2-(2,4,6-trichloro-3-(2,2 - dichloro - 1,1 - difluoroethoxy)phenoxy)ethanol gives complete control of *Staphylococcus aureus, Candida albicans, Trichophyton mentagrophytes, Bacillus subtilis, Candida pelliculosa* and *Mycobacterium phlei* when such organisms are contacted with compositions containing the compound at a concentration of 500 parts per million by weight.

In further representative operations, each of the 2-(3-(2,2-dichloro-1,1-difluoroethoxy)phenoxy)ethanol,
2-(4-(2,2-dichloro-1,1-difluoroethoxy)phenoxy)ethanol,
2-(4-(2,2-dichloro-1,1-difluoroethoxy)-2-nitrophenoxy)ethanol,
2-(2-(2,2-dichloro-1,1-difluoroethoxy)phenoxy)ethanol and
2-(2-chloro-5-(2,2-dichloro-1,1-difluoroethoxy)phenoxy)ethanol compounds gives substantially complete control of pigweeds and wild mustard-charlock when such plants are

| Example number | Name of product | Identifying characteristic of product |
|---|---|---|
| 2 | 2-(4-(2,2-dichloro-1,1-difluoroethxoy)phenoxy)ethanol | M.P.[1] 55–55.5° C. |
| 3 | 2-(4-(2,2-dichloro-1,1-difluoroethoxy)-2-nitrophenoxy)ethanol | B.P.[2] 170° C. at 0.2 mm. Hg. |
| 4 | 2-(2-chloro-5-(2,2-dichloro-1,1-difluoroethoxy)phenoxy)ethanol | B.P. 144–148° C. at 0.1 mm. Hg. |
| 5 | 2-(2,4,6-trichloro-3-(2,2-dichloro-1,1-difluoroethoxy)phenoxy)ethanol | B.P. 140° C. at 0.1 mm. Hg. |
| 6 | 2-(2-(2,2-dichloro-1,1-difluoroethoxy)phenoxy)ethanol | B.P. 110–114° C. at 0.8 mm. Hg. |
| 7 | 2-(2-bromo-5-(2-bromo-1,1,2-trifluoroethylthio)phenoxy)ethanethiol | M.M.[3] 426.12. |
| 8 | 2-(2-fluoro-5-(2,2,2-trichloro-1,1-difluoroethoxy)phenylthio)ethanethiol | M.W. 371.64. |
| 9 | 2-(2-iodo-5-(2,2,2-tribromo-1,1-difluoroethoxy)phenoxy)ethanethiol | M.W. 596.86. |
| 10 | 2-(5-(2,2,2,1,1-pentafluoroethoxy)-2-tert.-butylphenylthio)ethanol | M.W. 344.35. |
| 11 | 2-(2-(2,2-dichloro-1,1-difluoroethoxy)-3,5-diiodophenylthio)-1-butanol | M.W. 582.98. |
| 12 | 2-(3-chloro-5-bromo-2-(2,2-dibromo-1,1-difluoroethylthio)phenylthio)ethanethiol | M.W. 537.53. |
| 13 | 2-(2-(2,2-dichloro-1,1-difluoroethoxy)-3,5-difluorophenoxy)-1-propanol | M.W. 337.10. |
| 14 | 2-(4-bromo-3-(2,2-dichloro-1,1-difluoroethoxy)-2,6-dinitrophenoxy)-3,3'-dimethyl-1-butanethiol | M.W. 528.16. |
| 15 | 2-(2-(2,2-dichloro-1,1-difluoroethoxy)-3-iodo-5-nitrophenoxy)ethanol | M.W. 457.98. |
| 16 | 2-(2-bromo-4-chloro-5-(2-bromo-1,1,2-trifluoroethylthio)-6-fluorophenylthio)-1-butanol | M.W. 471.16. |
| 17 | 2-(3-(2,2-dichloro-1,1-difluoroethoxy)-2,4,6-triiodophenylthio)ethanethiol | M.W. 696.91. |
| 18 | 2-(4-(2,2-dibromo-1,1-difluoroethoxy)-2,6-difluorophenoxy)ethanol | M.W. 411.98. |
| 19 | 2-(2,6-dichloro-4-(2,2-dibromo-1,1-difluoroethoxy)phenoxy)-3,3'-dimethyl-1-butanethiol | M.W. 517.07. |
| 20 | 2-(2,2,2,1,1-pentafluoroethoxy)-3-tert.-butyl-5-nitrophenoxy)ethanol | M.W. 373.28. |
| 21 | 2-(2-(2,2-dibromo-1,1-difluoroethoxy)-3,5-di-propylphenoxy)-1-propanethiol | M.W. 490.26. |
| 22 | 2-(3-(2,2-dichloro-1,1-difluoroethoxy)-2,4,6-triethylphenylthio)ethanol | M.W. 387.32. |
| 23 | 2-(4-(2-bromo-1,1,2-trifluoroethoxy)-2,6-di-tert.-butylphenoxy)ethanol | M.W. 427.31. |
| 24 | 2-(2-(2,2-dibromo-1,1-difluoroethoxy)-3-propyl-5-iodophenylthio)-1-butanol | M.W. 588.10. |
| 25 | [2-(2-bromo-4-(2,2-dichloro-1,1-difluoroethylthio)-6-ethylphenoxy)-1-propanol | M.W. 394.07. |
| 26 | 2-(2-chloro-3-(2,2-dibromo-1,1-difluoroethoxy)-5,6-diethylphenylthio)ethanethiol | M.W. 498.68. |
| 27 | 2-(2-chloro-3-(2,2-dichloro-1,1-difluoroethoxy)-4-tert.-butyl-6-nitrophenoxy)ethanol | M.W. 376.64. |

[1] M.P.=Melting point.
[2] B.P.=Boiling point.
[3] M.W.=Molecular weight.

The compounds of the present invention are suitable for use as herbicides and fungicides. When the product is so employed, the unmodified substance can be utilized. However, the present invention also embraces the use of the compound in a formulation. Thus, for example, the compound can be dispersed on a finely divided solid and emcontacted with compositions containing one of the above-named compounds at a dosage rate of 20 pounds per acre.

The substituted phenoxy- or phenylthio-alkylacetate and alkanethioacetate compounds employed as starting materials in the present invention are prepared by the reaction of a substituted acetate compound corresponding to the formula:

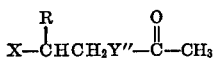

with a substituted haloalkoxy- or haloalkylthio-phenol or thiophenol compound of the formula:

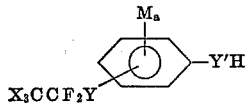

and potassium carbonate in the presence of an inert solvent such as, for example, carbon tetrachloride, acetonitrile, chloroform and the like which serves as a carrier medium. In the above formulas, X, X', Y, Y', Y'', M, $a$ and R are as previously defined.

The reaction takes place smoothly at temperatures of from about 0 to about 120° C.; generally, the reaction is carried out at the boiling point of the reaction mixture under reflux conditions for a period of from about 10 to about 30 hours. A three- to four-fold excess of the substituted acetate reactant is preferably employed, portions of the excess acetate reactant being added to reaction mixture during the course of the reaction. Following the completion of the reaction, the reaction mixture is cooled and filtered, and the carrier medium removed in vacuo to obtain the product as a liquid residue. In certain instances, where partial hydrolysis of the product to the corresponding phenoxyethanol is indicated, the product residue is treated with acetic anhydride at a temperature of from about 100–125° C. for a period of from about one-half to about two hours. The product residue thus obtained can be further purified by employing conventional techniques, such as, for example, distillation, vapor phase chromatography and the like.

The substituted haloalkoxy- or haloalkylthio-phenol or thiophenol compounds employed as starting materials in the preceding reaction are prepared by halogenating or nitrating a corresponding unsubstituted haloalkoxy- or haloalkylthio-phenol or thiophenol compound or a loweralkyl-substituted haloalkoxy- or haloalkylthio-phenol or thiophenol compound.

The addition of the halogenating or nitrating agent is conveniently carried out in the presence of an inert solvent, such as, for example, acetone, carbon tetrachloride, methylene chloride and the like, at temperatures of from about 0 to about 60° C. over a period of from about 10 minutes to about three hours. Ordinarily, a small amount of an actuating agent, e.g., ferric chloride, aluminum chloride, iodine and the like, is incorporated into the reaction mixture in order to decrease reaction time. Following the addition of the halogenating or nitrating agent, the reaction mixture is agitated at ambient temperatures for a period of from about 1 to about 18 hours, filtered, and washed with water, dilute hydrochloric acid, and the like and dried. Evaporation of the reaction mixture under reduced pressure leaves the desired product as a solid or viscous residue which can be further purified by employing conventional techniques.

The unsubstituted haloalkoxy- or haloalkylthio-phenol or thiophenol compounds employed in the halogenating and nitrating reactions above can be prepared by known or analogous procedures disclosed in the literature. For example, 3-(2,2-dichloro-1,1-difluoroethoxy)phenol is prepared by the reaction of resorcinol, 1,1-dichloro-2,2-difluoroethylene and potassium hydroxide in the presence of acetone. The 1,1-dichloro-2,2-difluoroethylene reactant is usually sparged into a mixture of the other reactants at a temperature of from about 0 to about 10° C. over a period of about two hours. Following the completion of the reaction, the solvent is removed by evaporation under reduced pressure and the residue thus obtained is dissolved in 10% aqueous potassium hydroxide and subsequently filtered. The aqueous solution is acidified with dilute hydrochloric acid, extracted with carbon tetrachloride and the extract dried over magnesium sulfate. Removal of the carbon tetrachloride solvent by distillation gives the desired 3-(2,2-dichloro-1,1-difluoroethoxy)phenol product as an oil having a boiling point of 108–109° C. at 0.2 millimeter of Hg.

The loweralkyl-substituted haloalkoxy- or haloalkylthio-phenol or thiophenol starting materials are prepared in analogous procedures by reacting a loweralkyl-substituted catechol, resorcinol or hydroquinone compound with a substituted difluoroethylene compound.

The fluoro-substituted or fluoro- and loweralkyl-substituted haloalkoxy- or haloalkylthio-phenol or thiophenol compounds employed in the halogenating and nitrating reactions above are prepared by introducing the fluorine atom into the ring prior to the preparation of the ether. These compounds are prepared from a fluoro- or a fluoro- and loweralkyl-substituted catechol, resorcinol or hydroquinone compound according to the procedures set forth in Illinois State Geoligocial Circular #199, p. 15 (1955). Other modes of substitution are readily arrived at by the synthesis of ortho-, meta-, or para-fluoro-(2,2-dihalo-1,1-difluoroethoxy)benzene compounds from the corresponding fluorophenols followed by nitration, reduction, diazatization, hydrolysis and the like.

The loweralkyl-substituted catechol, resorcinol and hydroquinone compounds and the substituted difluoroethylene compounds employed above in the preparation of starting materials and the substituted acetate compounds employed as starting materials in the present invention can be prepared by known or analogous methods disclosed in the literature or readily obtained from commercial sources.

Compounds containing the $CX_3CF_2Y$-moiety, wherein X represents bromo or chloro, are readily prepared by photochemically halogenating known compounds of the type

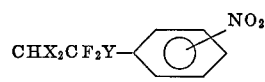

(See Lichtenberger, et al., Bull, Soc. Chim. Fr., 4, 581–596 (1957) with an appropriate halogenating agent, such as, for example, $Cl_2$, ClBr and the like, in the presence of a solvent such as carbon tetrachloride or a heterogeneous mixture employing water.

The compounds wherein X is fluoro are prepared by reacting the compounds wherein X is bromo or chloro with a molten antimony fluoro-chloro compound at a temperature of from about 80–120° C. for a period of from about ½ to about 2 hours.

The resulting halo substituted compounds of the above formula are readily reduced to the corresponding anilines with various reducing agents, such as, for example, zinc-hydrochloric acid, hydrogen-Raney nickel, and the like. The anilines are then reacted with sodium nitrite to form diazonium salts which are readily hydrolyzed to the corresponding phenols or thiophenols.

Secondary substituents on the ring may, depending upon the resistance of the substituent to the succeeding reactions, be introduced at various points in the reaction sequence or introduced after the phenol or thiophenol is obtained.

What is claimed is:

1. Compounds corresponding to the formula:

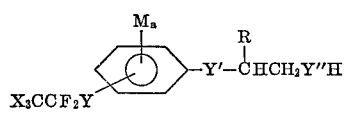

wherein
each X independently represents hydrogen, bromo, chloro or fluoro, with the proviso that at least one X is always bromo, chloro or fluoro;

Y, Y' and Y'' each independently represent oxygen or sulfur with the proviso that when Y and Y' are both oxygen, Y'' is sulfur;

each M independently represents bromo, chloro, iodo, fluoro, nitro or loweralkyl containing from 1 to 4 carbon atoms, both inclusive;

$a$ represents an integer of from 0 to 3, both inclusive, and R is hydrogen or loweralkyl containing from 1 to about 4 carbon atoms, both inclusive.

References Cited
UNITED STATES PATENTS

| | | | |
|---|---|---|---|
| 3,674,857 | 7/1972 | Reifschneider | 260—609 F |
| 3,714,233 | 1/1973 | Larsen et al. | 260—609 D |

LEWIS GOTTS, Primary Examiner

D. R. PHILLIPS, Assistant Examiner

U.S. Cl. X.R.

260—609 F